Patented Jan. 6, 1942

2,269,248

UNITED STATES PATENT OFFICE 2,269,248

CONTROL DEVICE FOR BURNERS

James L. Breese, Santa Fe, N. Mex., assignor to Oil Devices, Santa Fe, N. Mex., a limited partnership of Illinois Application May 20, 1940, Serial No. 336,223

10 Claims. (Cl. 158—28)

My invention relates to an improvement in control means for burners and is particularly adaptable for use with liquid hydrocarbon burners in which a fan or the like is employed to provide more than atmospheric pressure.

One purpose is the provision of combined control means and switch mechanism for controlling the supply of a liquid fuel to a burner and at the same time, and unitarily, controlling the starting and stopping of the motor.

Another purpose is the provision of a switch control which is responsive to the movement of a handle controlling the fuel inlet valve.

Another purpose is the provision of an electric switch so disposed that when the oil is turned on beyond a certain point, a high voltage circuit is closed.

Other purposes will appear from time to time in the course of the specification and claims.

I illustrate my invention more or less diagrammatically in the accompanying drawing wherein:

Fig. 1 is a vertical section with parts in elevation;

Fig. 2 is an enlarged view of a portion of the structure shown in Fig. 1;

Fig. 3 is a section on the line 3—3 of Fig. 2;

Fig. 4 is an enlarged section taken on the line 4—4 of Fig. 1; and

Fig. 5 is a diagram.

Like parts are indicated by like symbols throughout the specification and drawing.

Referring to the drawing, 1 generally indicates any suitable outer drum or housing for circulating heaters or the like. It may be mounted on legs 2 to permit air to flow inwardly and upwardly. In the outer housing 1 is an inner drum 3 having a bottom 4 with a central aperture as at 5, and a blower unit secured thereto. The blower unit may include a motor 6, a base plate 7, secured to the bottom 4, a motor shaft 8, and a fan 9 thereon, the vanes of the fan 9 extending upwardly through the aperture 5.

10 are any suitable air inlet apertures in the base plate structure 7. It will be understood that I thus provide a motor which is effective to draw air from the outside and direct it upwardly and inwardly.

11 is a pot having a slightly concave bottom 12 and a liquid fuel supply line 13. The pot may be provided with any suitable air inlet apertures 11a, of which only the lowest are shown. It will be understood that the air may be directed through these apertures under pressure caused by the rotation of the fan 9.

14 is any suitable float chamber, the details of which do not of themselves form part of the present invention. 15 is a fuel line extending from any suitable fuel supply to the float chamber 14. 16 is a valve passage in communication with the fuel line 13 to the pot 11. 17 is any suitable valve means for controlling the valve passage 16. The details of the valve do not of themselves form part of the present invention. However, I illustrate it as including a valve stem 18 provided with a top cam 19, which may also perform the function of a handle and which, when rotated, opens or closes the valve 17. I may employ numbers to illustrate for the operator the degree of opening, "1" being the minimum opening. It will be understood that, whereas I have shown the cam as used as a handle, obviously an additional handle or hand piece may be located on the stem 18 above the cam.

20 illustrates a switch box which may be mounted on the cover 21 of the float chamber 14 and may be provided itself with a removable cover 22. 23 is a flexible conduit extending from the motor 6 to the switch box 20, which may enclose any suitable conductors 24, in circuit with the motor 6.

25 indicates generally a switch having a plunger 26, which makes contact when pushed toward the right, referring to the position of the parts in Figs. 2 and 3, and which breaks contact on release. The wiring diagram involved does not of itself form part of the invention. I illustrate, however, in Fig. 5 any suitable spring means 27 and movable contact 28, together with a fixed contact 29, which is employed.

It will be realized that, whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

For example, in the event that I wish to employ a two-speed motor, one speed for the low and one speed for the high operation of the fan, I may interpose a variable resistance 30, shunted across the movable contact 28 and fixed contact 29, which is rendered ineffective when the above contacts are closed. In other words, the motor is operating at low speed when the contact members are open on account of the resistance referred to above; however, if the contact members 28, 29 are closed, the motor operates at high speed.

extent from the position of minimum valve opening toward the position of maximum valve opening whereby the switch operating member closes the switch only after appreciable valve opening has taken place.

8. In combination, in control means for a liquid fuel burner, a float chamber, a rotatable valve located in said chamber, and a valve seat to which it is opposed, means for rotating said valve, including a rotatable manual control knob located exteriorly of said float chamber, a switch on said float chamber, and means for controlling said switch, including a spiral cam rotatable with said knob, and a switch operating member opposed to said cam, said cam being adapted to move said switch operating member to switch closing position when the knob has been rotated to a predetermined valve opening position, and yielding means adapted normally to hold said switch in circuit breaking position, with said switch operating member opposed to said cam the cam being cylindrical for a portion of its angular extent from the position of minimum valve opening toward the position of maximum valve opening whereby the switch operating member closes the switch only after appreciable valve opening has taken place.

9. In combination, in control means for a liquid fuel burner, a float chamber, a valve in said chamber, and a valve seat to which it is opposed, means for setting said valve, including an exterior manually operable valve adjusting member supported on said float chamber, a switch supported on said chamber, and means for controlling said switch in response to the movement of said valve adjusting member the cam being cylindrical for a portion of its angular extent from the position of minimum valve opening toward the position of maximum valve opening whereby the switch operating member closes the switch only after appreciable valve opening has taken place.

10. In combination with a liquid fuel burner having an electric motor driven, forced draft fan and a fuel supply, a unit control assembly for fan and fuel supply including a float chamber, a fuel control valve and a switch, housing means enclosing them, a manually operable rotatable valve control knob exterior of the housing, a direct connection between the switch and the knob adapted to close the switch to start the motor to drive the fan only after a predetermined valve opening rotation of the knob has taken place and to hold the switch closed thereafter until the knob has been returned to the position at which switch closure commenced, the knob including a cam, the connection between it and the switch including a plunger adapted to engage the working face of the cam, the cam being cylindrical throughout a portion of its angular extent commencing adjacent the point at which the plunger contacts the cam when the valve is closed and extending in the direction of valve opening movement.

JAMES L. BREESE.

Jan. 6, 1942. W. P. FALKENBERG 2,269,258
TARGET RIFLE RANGE
Original Filed Dec. 7, 1936 2 Sheets-Sheet 1
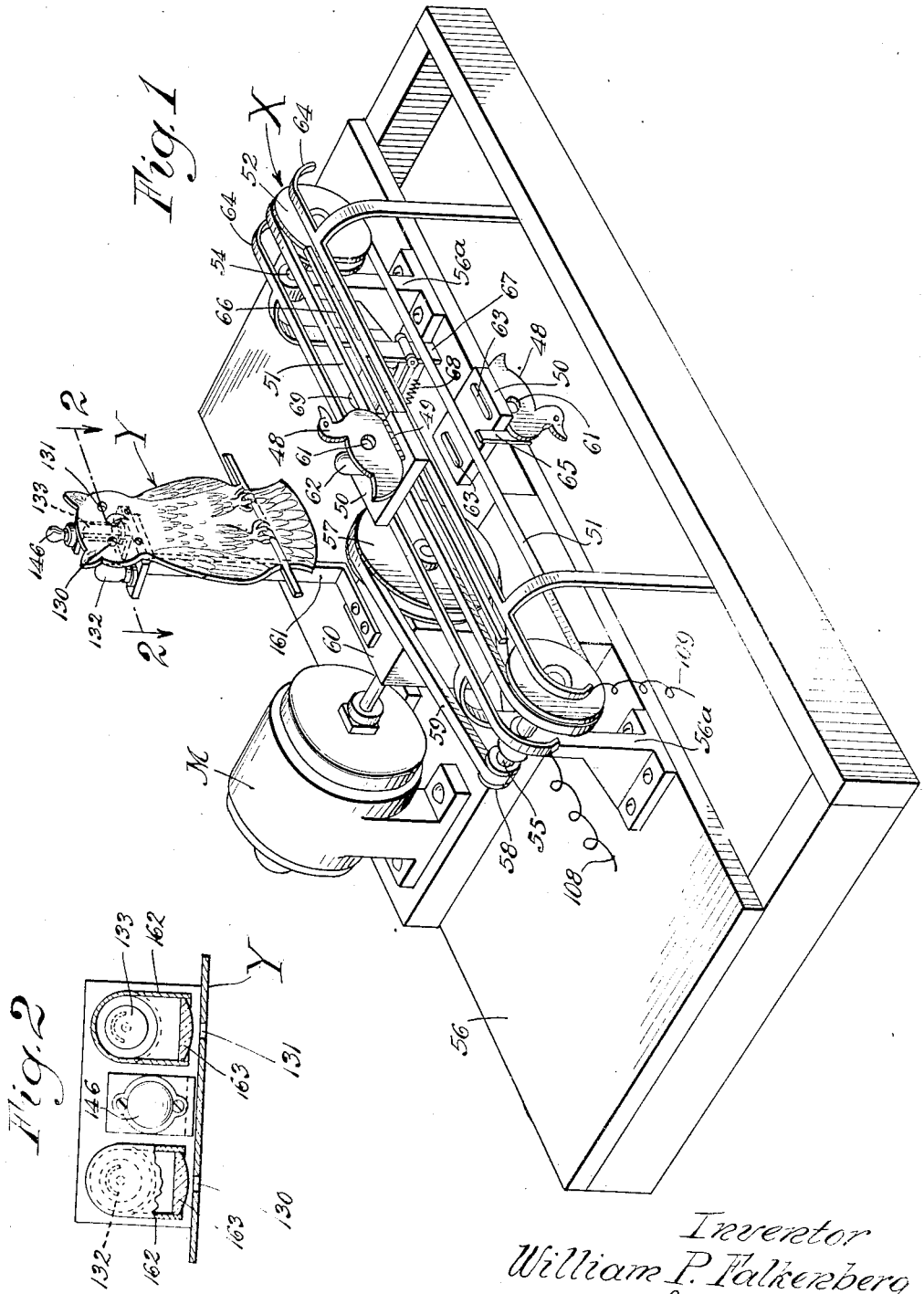
Inventor
William P. Falkenberg
by Parker & Carter
Attorneys.